United States Patent [19]

Huggler

[11] 4,382,175
[45] May 3, 1983

[54] APPARATUS FOR CONTROLLING TOAST COLOR IN A TOASTER OVEN

[75] Inventor: Peter E. Huggler, Boone County, Mo.

[73] Assignee: Toastmaster, Inc., Columbia, Mo.

[21] Appl. No.: 318,398

[22] Filed: Nov. 5, 1981

[51] Int. Cl.³ ........................................... F27D 11/02
[52] U.S. Cl. ................................. 219/413; 99/329 R; 99/388; 219/396; 219/398; 219/414; 219/512; 219/521
[58] Field of Search ............... 219/411, 412, 413, 405, 219/414, 393, 395, 396, 397, 398, 492, 494, 521, 512; 426/665, 383, 385, 386; 99/385, 326, 388, 328, 389, 329 R

[56] References Cited

U.S. PATENT DOCUMENTS

| | | | |
|---|---|---|---|
| 3,626,155 | 12/1971 | Joechel | 219/411 |
| 3,684,860 | 8/1972 | Snyder | 219/413 |
| 3,828,163 | 8/1974 | Amagami et al. | 219/413 |
| 4,065,658 | 12/1977 | Keim | 219/386 |
| 4,065,659 | 12/1977 | Yount et al. | 219/398 |
| 4,345,145 | 8/1982 | Norwood | 219/492 |

*Primary Examiner*—Volodymyr Y. Mayewsky
*Attorney, Agent, or Firm*—Kokjer, Kircher, Bradley, Wharton, Bowman & Johnson

[57] ABSTRACT

A method and apparatus for controlling the heating of toast in a toaster oven broiler. The adjustment shaft for the thermostat which controls the baking and broiling modes receives a circular dial having toast color indications thereon corresponding to light, medium and dark toast colors. The dial is rotatable on the thermostat shaft under the control of a bimetal strip which responds to temperature changes in the oven cavity. As the oven temperature increases during each successive toasting cycle, the dial rotates and at the end of the cycle indicates the thermostat setting that will achieve the desired toast color for the next toasting cycle.

7 Claims, 8 Drawing Figures

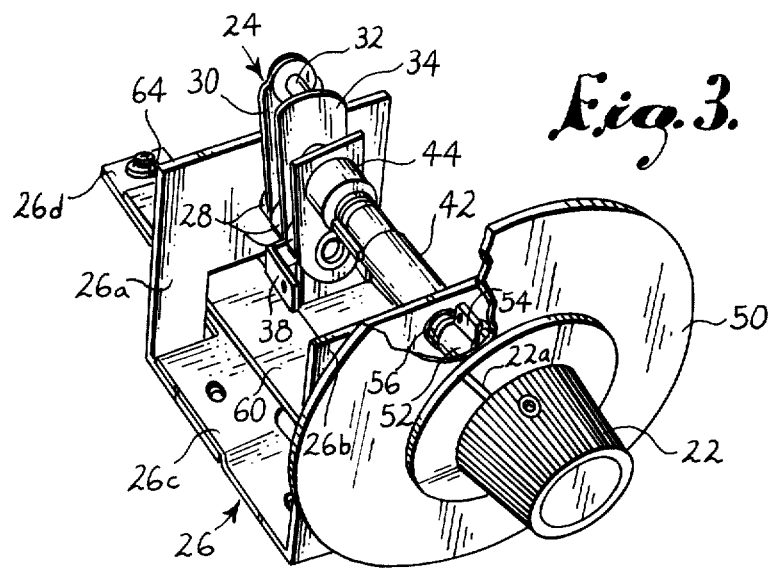
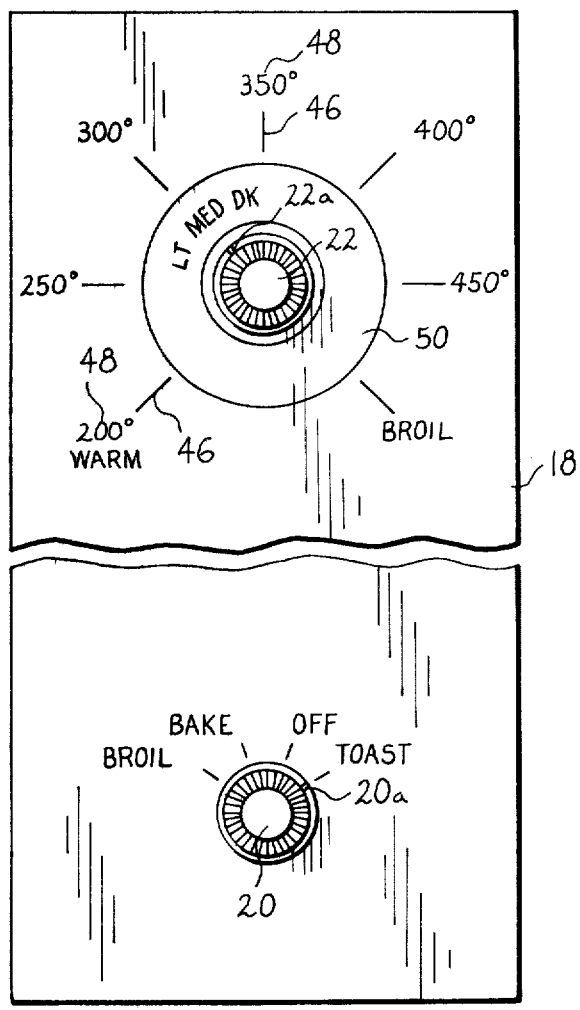
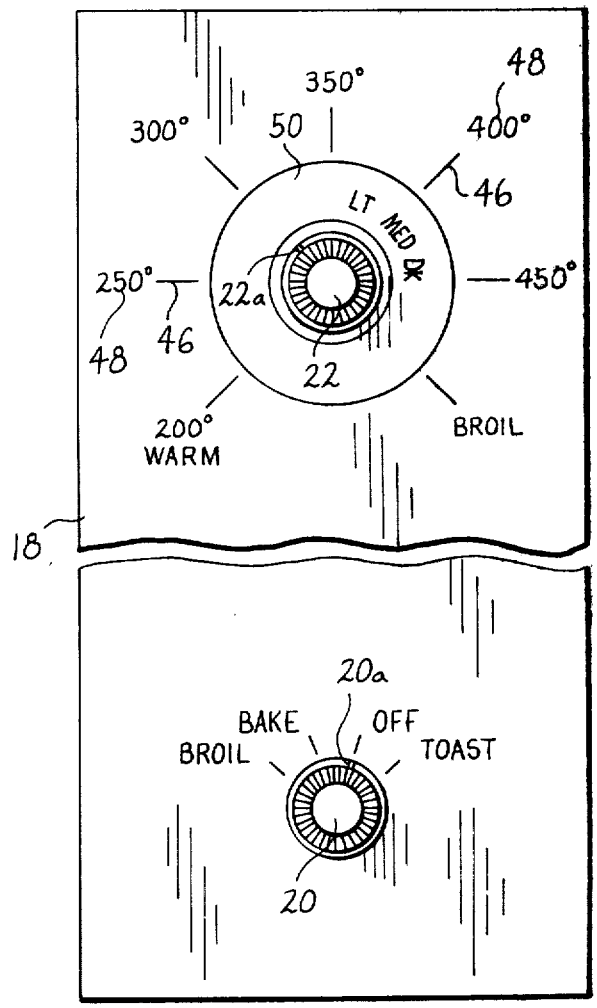

APPARATUS FOR CONTROLLING TOAST COLOR IN A TOASTER OVEN

BACKGROUND AND SUMMARY OF THE INVENTION

This invention relates generally to toaster ovens and more particularly to an improved arrangement for controlling the toasting cycle in a toaster oven or toaster oven broiler.

Toaster ovens and toaster oven broilers have achieved considerable popularity in recent years, due in large part to their versatility and convenience. In the baking and broiling modes of operation, the air temperature in the oven cavity is normally controlled by a thermostat which maintains the set temperature. In the toasting mode, control of the toasting cycle has been more difficult. Most commonly, the toaster oven or toaster oven broiler is equipped with a timer which is manually set at the beginning of the toast cycle and automatic shuts off the heating elements when the toast cycle is completed. Various types of timers have been used such as heat up-cool off bimetal timers and electronic timers. Another technique for controlling the toast cycle has been to provide a device which senses the surface temperature of the bread that is being toasted and terminates the cycle when a predetermined bread temperature is reached. These devices have employed bimetal temperature sensors and electronic temperature sensing circuits.

To my knowledge, all toaster oven broilers that have been proposed in the past have included, in addition to the thermostat which controls the baking and broiling operations, a separate timer or other mechanism for terminating the toasting cycle at the proper time. The need for a separate device to control the toasting mode of operation not only complicates the construction and use of the toaster oven but also adds significantly to its cost.

Therefore, it is the principal goal of the present invention to provide a simple and economical device for accurately controlling the toast cycle in a toaster oven broiler.

More specifically, it is an important object of the invention to provide a toast control method and device which uses the existing oven control thermostat to achieve accurate control of the toast color. This eliminates the need for a separate timer and reduces the cost and complexity accordingly.

Another important object of the invention is to provide a toast control method and device which is adapted for use with toaster ovens employing different types of oven control thermostats. In this regard, it is important to recognize that the invention can be used with thermostats that are adjustable by means of control levers and the like as well as those controlled by rotary knobs.

Other and further objects of the invention, together with the features of novelty appurtenant thereto, will appear in the course of the following description.

DETAILED DESCRIPTION OF THE INVENTION

In the accompanying drawings which form a part of the specification and are to be read in conjunction therewith and in which like reference numerals are used to indicate like parts in the various views:

FIG. 3 is a perspective view of the toast control device taken from the side thereof opposite the side shown in FIG. 2, with a portion of the dial broken away for purposes of illustration;

FIG. 4 is a diagrammatic elevational view of the control panel of the toaster oven broiler, with the control knobs set to initiate toasting of a first load of bread to a medium toast color;

FIG. 5 is a diagrammatic elevational view of the control panel at the end of the first toasting cycle;

Figure 1:
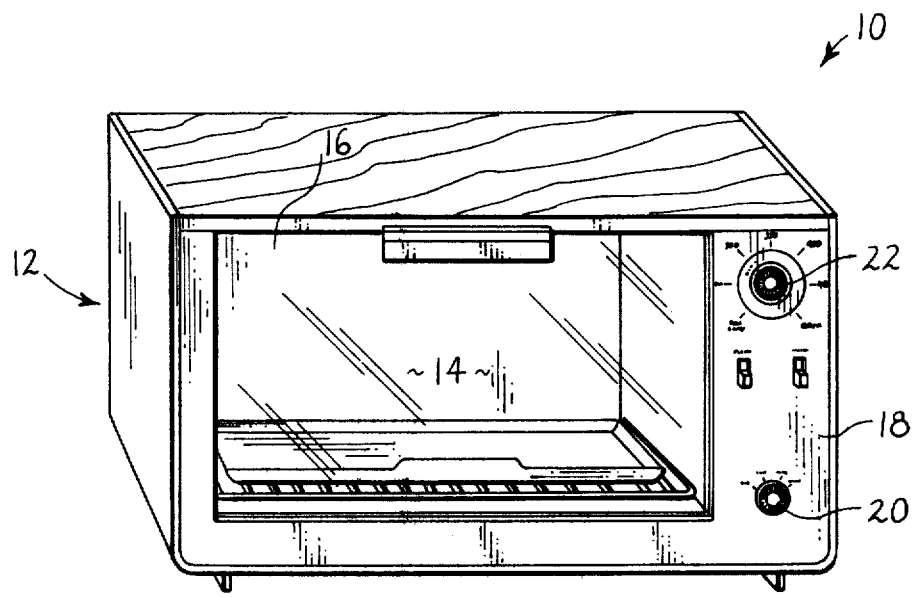
FIG. 1 is a perspective view of a toaster oven broiler which is equipped with a toast control device constructed according to a preferred embodiment of the present invention.

Referring now to the drawings in more detail and initially to FIG. 1, numeral 10 generally designates a toaster oven broiler having a generally rectangular cabinet 12 in which an enclosed cooking cavity 14 is formed. A transparent door 16 on the front of the cabinet may be opened to provide access to the cooking cavity 14 and is closed during operation of the unit. Conventional electric heating elements (not shown) are provided in the cooking cavity 14 in order to heat the foods that are inserted therein.

A control panel 18 located on the front of the cabinet to one side of the door 16 is provided with a lower knob 20 which controls a four position switch that alters the circuitry to the heating elements in a manner to control the operating mode of the toaster oven broiler. As best shown in FIGS. 4-8, knob 20 has an "off" setting at which no current is delivered to the heating elements, a "toast" setting for toasting bread, a "bake" setting for baking foods, and a "broil" setting for broiling foods in the oven cavity. An indicator mark 20a on knob 20 indicates the operating mode at which the knob is set.

Figure 2:
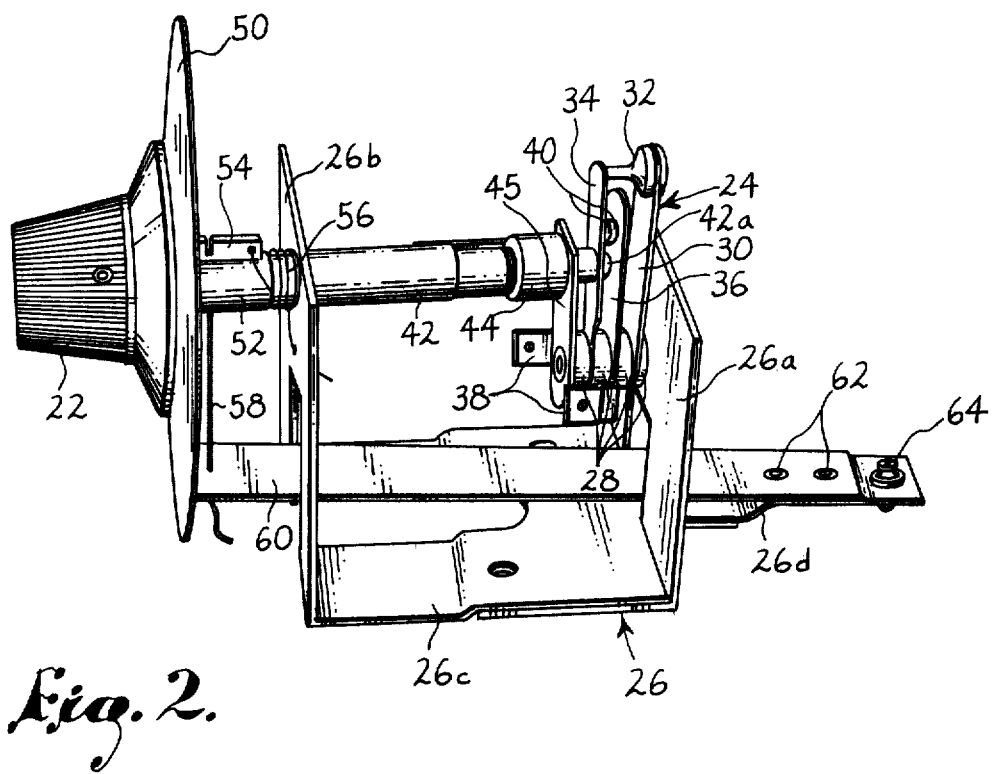
FIG. 2 is a perspective view of the toast control device detached from the remainder of the toaster oven broiler.

The control panel 18 also includes an upper knob 22 which is a rotary knob that controls the setting of a thermostat which is generally designated by numeral 24 (see FIGS. 2 and 3). The thermostat 24 is mounted on a generally U shaped metal bracket 26 having spaced apart plates 26a and 26b which are parallel to one another and interconnected at the bottom by a base 26c. The thermostat 24 is mounted to plate 26a.

With continued reference to FIGS. 2 and 3, thermostat 24 includes a stack of insulating discs 28 which may be secured to plate 26a in any suitable manner. A bimetal strip 30 extends from between one pair of discs 28 and includes an insulator 32 on its free end which contacts the free end of a strip 34 projecting from between another pair of discs. Another strip 36 is spaced between the bimetal strip 30 and strip 34. Strips 34 and 36 have terminal connectors 38 that connect with wiring for the control circuit of the toaster oven. Electrical contacts 40 on strips 34 and 36 contact one another when the air temperature within the oven cavity 14, as sensed by the bimetal strip 30, is below the thermostat setting. The heating elements are then energized. When the oven temperature reaches the temperature setting of the thermostat, the bimetal strip 30 deforms toward strip 34, and its insulator 32 pushes a strip 34 away from strip 36 to break the electrical contacts 40, thereby interrupting the electrical circuit leading to the heating elements. In this manner, the heating elements are deenergized when the thermostat is satisfied.

Adjustment of the thermostat setting is achieved by turning the rotary knob 22 which is secured on the end of a shaft 42. Shaft 42 extends through an opening in plate 26b and is threaded through an internally threaded sleeve 44 mounted on a small plate 45 forming part of the thermostat. The end of shaft 42 has a button 42a which contacts the center strip 36 of the thermostat. When the control knob 22 is turned clockwise, the threaded engagement between shaft 42 and sleeve 44 retracts button 42a away from strip 36. A higher air temperature and greater deformation of the bimetal strip 30 is then required to break the contacts 40, and the temperature setting of the thermostat is thus increased when knob 22 is turned clockwise. Conversely, counterclockwise rotation of knob 22 decreases the temperature setting of the thermostat.

On the control panel 18, an arcuate temperature scale surrounds knob 22 and includes a series of calibration marks 46 and associated temperature indications 48 which are arranged arcuately about the knob 22. An indicator mark 22a on the periphery of knob 22 aligns with the calibration marks of the temperature scale to indicate the temperature setting of the oven cavity 14.

In accordance with the present invention, a circular dial 50 is received on the thermostat shaft 42 at a location between knob 22 and the front of the control panel 18. Extending from dial 50 is a sleeve 52 which, with the dial, fits loosely enough on shaft 42 to be able to rotate thereon. Sleeve 52 has a projecting ear 54 to which one end of a small torsion spring 56 is hooked. The opposite end of spring 56 is hooked to plate 26b. The torque which is applied to sleeve 52 by the torsion spring 56 continuously urges the sleeve and dial 50 in a clockwise direction on shaft 42 as viewed from the front.

The torque applied to dial 50 is resisted by a flexible string 58 which is connected at its upper end with ear 54 and at its lower end with the free end of a bimetal strip 60. The opposite end of the bimetal strip 60 is connected at 62 with a projecting leg portion 26d of bracket 26. The string 58 is normally in a taut condition and resists the tendency for dial 50 to rotate in a clockwise direction under the influence of the torsion spring 56. The bracket leg 26d receives an adjustment screw 64 which engages a portion of the toaster oven broiler housing at its end. By adjusting screw 64, the angle of the bracket leg 26d and bimetal strip 60 can be adjusted in order to adjust the rotative position of dial 50 at a given temperature.

As shown in FIGS. 4–8, the front face of dial 50 is provided with a plurality of toast color indications or settings, including a "light" setting (LT), a "medium" setting (MED) and a "dark" setting (DK). The light, medium and dark indications on dial 50 provide a toast color scale thereon and are spaced apart in an arcuate arrangement about the center of knob 22. The toast color indications thus rotate with dial 50 in response to changes in the oven cavity temperature, as will be described in more detail.

The rotary dial 50 is initially positioned such that with the oven cool (the oven cavity temperature at room temperature), the light, medium and dark indications on the dial are positioned to correspond with the temperatures on the temperature scale to which the oven cavity must be heated in order to toast bread to the desired color. For example, if the oven cavity 14 must be heated to 300° F. in order to toast bread to a medium color, dial 50 is initially in the position shown in FIG. 4 wherein the medium indication is aligned with the 300° calibration mark on the temperature scale of the thermostat. The light indication is at approximately 275° F. and the dark indication is at approximately 325° F., indicating that the oven cavity must be heated to 275° and 325° in order to toast the bread to light and dark colors, respectively.

The toaster oven broiler 10 operates in a conventional manner in the bake and broiler modes. For example, if food is to be baked at 350° F., knob 20 is turned to the "bake" setting and knob 22 is turned to align mark 22a with the 350° setting on the temperature scale. When the oven temperature reaches 350° F., the thermostat contacts 40 are broken in order to deenergize the heating elements. The thermostat then cycles the heating elements on and off to maintain the oven temperature at approximately 350° F. Similarly, in the broiler mode of operation, knob 20 is moved to the "broil" setting and knob 22 is rotated to align mark 22a with the broil setting on the temperature scale.

In the toasting mode of operation, the bread which is to be toasted is inserted into the oven cavity 14 and knob 22 is rotated to align mark 22a with the medium indication on dial 50 if medium toast is desired. When knob 20 is then turned to the "toast" setting, the heating elements are energized to toast the bread until the oven cavity temperature reaches 300° F. which is the temperature corresponding to the medium indication on dial 50 at the beginning of the first toasting cycle. When the oven temperature reaches the 300° F. thermostat setting, the thermostat is satisfied and contacts 40 break to deenergize the heating elements. At the same time, a conventional buzzer or other warning device (not shown) is activated to inform the user that the first toasting cycle is completed. Knob 20 is then rotated to the "off" position, door 16 is opened, and the toast is removed from the oven cavity. As the oven cavity temperature increased during the first toasting cycle, dial 50 rotated from the FIG. 4 position to the FIG. 5 position due to the temperature increase. An increase in the oven temperature deforms the free end of the bimetal strip 60 upwardly, thus providing a small amount of slack in line 58 which permits the torsion spring 56 to rotate dial 50 in a clockwise direction until string 58 is again taut.

Figure 6:
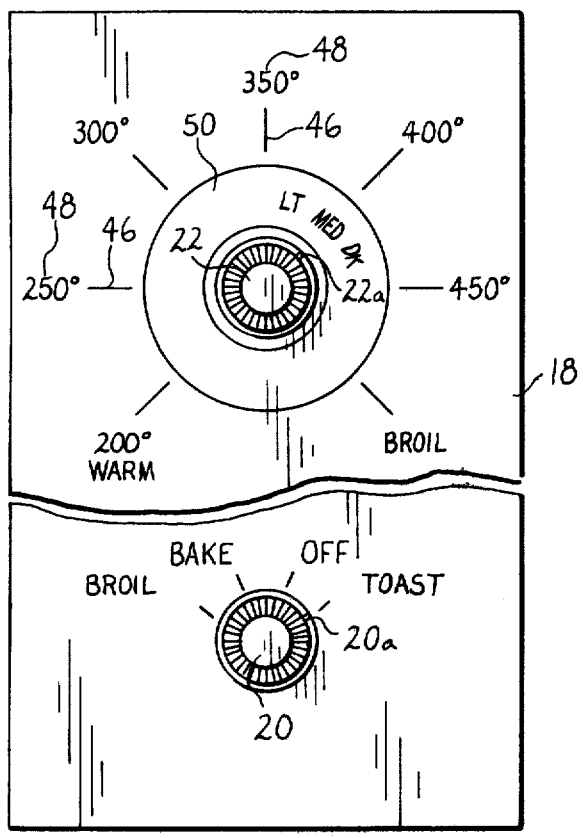
FIG. 6 is a diagrammatic elevational view of the control panel with the control knobs set to initiate toasting of a second load of bread to a medium toast color.

When the first toasting cycle has been completed and the first load of toast has been removed, the components on the control panel are in the positions shown in FIG. 5. After the second load of bread has been loaded into the oven cavity 14 and door 16 has been closed, knob 22 is turned in a clockwise direction until its indicator mark 22a is again aligned with the medium indication on dial 50 (as shown in FIG. 6), which positions mark 22a in alignment with the 400° F. mark on the temperature scale. This is the temperature to which the oven cavity must be heated in order to toast the second load of bread to a medium color, since the medium indication on dial 50 rotated to the 400° position as the first load of bread was being toasted.

As shown in FIG. 6, after knob 22 has been rotated to the 400° setting (or in alignment with the medium indication on dial 50), the lower knob 20 is again moved to the "toast" setting in order to initiate the second toasting cycle. When the oven temperature reaches 400°, the thermostat is satisfied, contacts 40 are broken to deenergize the heating elements, and the buzzer is sounded to indicate to the user that the second toasting cycle has been completed. The lower knob 20 is then turned to the off setting, and the toast is removed from the oven.

Figure 7:
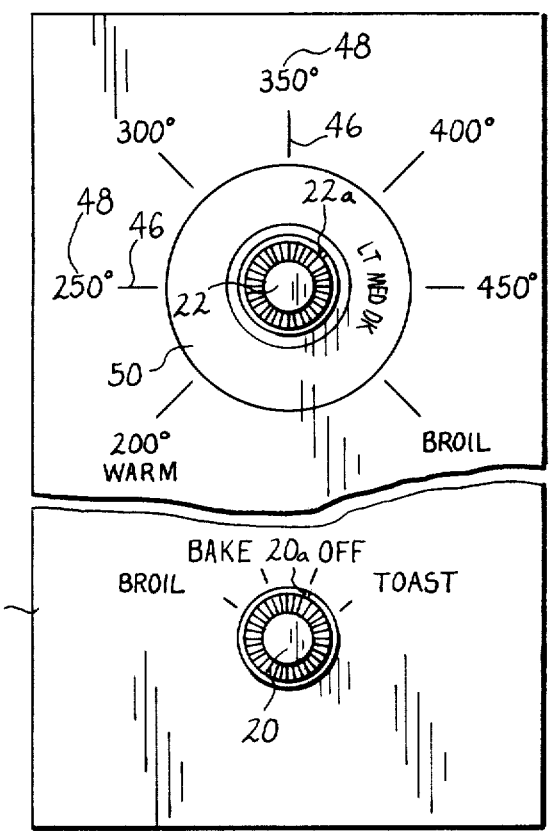
FIG. 7 is a diagrammatic elevational view of the control panel at the end of the second toasting cycle.
Figure 8:
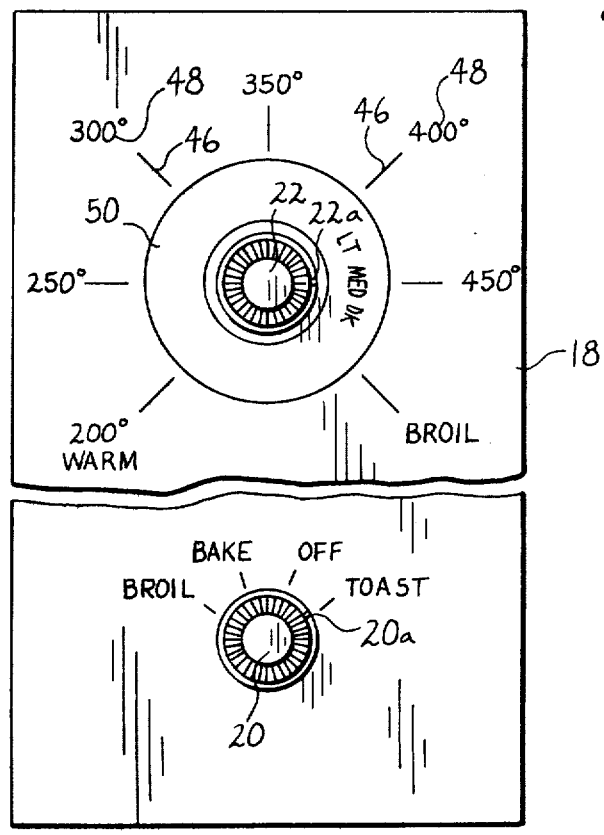
FIG. 8 is a diagrammatic elevational view of the control panel with the control knobs set to initiate toasting of a third load of bread to a medium toast color.

The position of the components at the end of the second toasting cycle is shown in FIG. 7, and it is noted that dial 50 has rotated additionally in a clockwise direction such that the medium indication is aligned with the 450° F. mark on the temperature scale. The third toasting cycle is initiated by rotating knob 22 until mark 22a is aligned with the medium indication at 450° F. and then moving the lower knob 20 to the "toast" setting as shown in FIG. 8. When the oven cavity temperature reaches 450° F., the third toasting cycle is completed and the third load of bread will then be toasted to a medium color. Again, the heating elements are deenergized and the buzzer is sounded when the thermostat is satisfied.

Successive toasting cycles are carried out in this manner until the color scale on dial 50 has rotated clockwise beyond the "broil" indication on the temperature scale. When this occurs, the toaster oven broiler must cool until the scale has moved counterclockwise back past the "broil" setting of the temperature scale. Knob 22 can then be set at the light, medium or dark indication in order to toast the next load of bread. Since the free end of the bimetal strips 60 moves downwardly with decreasing oven temperature, a decrease in temperature rotates dial 50 in a counterclockwise direction against the force of spring 56. Consequently, at any oven cavity temperature, knob 22 can be set to the desired toast color, and the bread will be toasted to that color at the end of the toasting cycle as indicated by the buzzer or other audible warning device.

It is to be understood that the invention is equally useful with a thermostat having a lever or other straight line control member. In this case, the toast color scale would be arranged to move linearly parallel with the path of movement of the control lever. With increasing oven temperature, the color scale would move in the same direction the control lever moves to increase the temperature setting of the thermostat. It should also be understood that movement of the toast color scale with temperature changes can be effected by means other than the bimetal strip and torsion spring arrangement illustrated herein. For example, a spiral bimetal element can be used to rotate the dial with temperature changes, or another type of mechanical mechanism can be used to effect turning of a rotary dial with temperature changes.

The invention also contemplates carrying out the same function without the need to reset the other dial 22 at the beginning of each successive toasting cycle. Another knob or a toast start lever could be used to lock the thermostat in a fixed position when activated. The thermostat would be automatically rotated to the next temperature at the end of the toasting cycle by means of a solenoid or other device which would release the toast start lever at the end of the cycle and at the same time release the rear portion of the thermostat body. The unlocked rear portion of the thermostat would then be rotated by a bimetal to reset the thermostat to the next temperature setting, at which point the solenoid would again lock the thermostat. When the second toasting cycle is initiated, the thermostat would thus be locked in position, and it would be unlocked at the end of the second cycle and thereafter adjusted again by the bimetal.

A second contemplated variation would include a clamping mechanism (not shown) which would clamp and prevent dial 50 from rotating when knob 20 is rotated to the "toast" position. Clamping dial 50 would prevent the toast color scale from moving during the toasting operation, thereby allowing the user to reset or change, the toast color desired during the toasting operation. When knob 20 was turned to the off position dial 50 would be released and immediately rotate clockwise to indicate the setting for the next toasting operation.

From the foregoing, it will be seen that this invention is one well adapted to attain all the ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawing is to be interpreted as illustrative and not in a limiting sense.

Having thus described the invention, I claim:

1. In a toaster oven having an oven cavity for receiving food including bread to be toasted, means for heating the oven cavity, a thermostat for controlling said heating means, a temperature scale, a manually operated control member for setting the thermostat, and an indicator mark on said control member for indicating on said temperature scale the temperature setting of the thermostat, the combination therewith of:

a movable toast color scale located adjacent said temperature scale and movable independently of said control member along a preselected path corresponding to the path of movement of said control member when same is adjusted to vary the thermostat setting;

temperature sensitive means for effecting movement of said toast color scale along said preselected path in a first direction when the oven cavity temperature increases and in a second direction opposite said first direction when the oven cavity temperature decreases, said first direction corresponding to movement of said control member in a direction to increase the temperature setting of the thermostat; and a plurality of toast color indications on said color scale each indicating a different desired toast color, each color indication moving with said color scale along the temperature scale and being located thereon to align with a temperature indication on the temperature scale that will effect toasting of the bread to the corresponding color when said control member is moved to set said indicator mark at the color indication and the thermostat is subsequently satisfied to deenergize the heating means.

2. The invention of claim 1, wherein said temperature sensitive means comprises:

means independent of said thermostat for sensing the oven cavity temperature; and means for effecting movement of said color scale in the first direction when increasing temperature is sensed by said sensing means and in the second direction when decreasing temperature is sensed by said sensing means.

3. In a toaster oven having an oven cavity for receiving food including bread to be toasted, means for heating the oven cavity, a thermostat for controlling said heating means, a rotary knob for varying the thermostat setting, a temperature scale around the knob and an indicator mark on the knob for indicating the thermostat setting on the temperature scale, the combination therewith of:

a toast color dial adjacent said knob and supported for rotary movement about said knob;

means independent of said thermostat for sensing the oven temperature cavity;

means for effecting rotary movement of said dial about said knob in one rotational direction when said sensing means senses increasing temperature in the oven cavity and in the opposite rotational direction when said sensing means senses decreasing temperature in the oven cavity, said one rotational direction corresponding to the direction said knob is turned to increase the thermostat setting; and a plurality of toast color indications on said dial spaced apart thereon in an arcuate pattern and each indicating a different desired toast color, each color indication being located, when the oven cavity is at room temperature, in a position corresponding to a temperature indication on said temperature scale to which the oven cavity must be heated to effect the corresponding toast color, whereby successive loads of bread can be toasted to the desired color by turning the knob to set said indicator mark at the corresponding color indication and removing the toast when the thermostat is satisfied to deenergize said heating means before loading the next load of bread into the oven cavity.

4. The invention of claim 3, wherein:

said sensing means includes a bimetal element deforming in opposite directions in response to increasing and decreasing temperatures; and said movement effecting means includes a linkage coupling said bimetal element with said dial in a manner to rotate the latter in opposite directions in response to deformation of said bimetal element in opposite directions.

5. The invention of claim 4, wherein said linkage includes:

spring means for continuously urging said dial in said one rotational direction; and a flexible line extending in a taut condition between said bimetal element and dial to resist turning of said dial in said one rotational direction, said line becoming slack upon deformation of said bimetal element in a direction corresponding to increasing temperature, thereby permitting said dial to turn in said one rotational direction under the influence of said spring means.

6. The invention of claim 3, wherein:

said knob is mounted on a shaft which adjusts the temperature setting of the thermostat upon turning of the shaft;

said dial is mounted on said shaft for rotation thereon;

said sensing means includes a bimetal element deforming in opposite directions in response to increasing and decreasing temperatures; and said movement effecting means includes means for converting deformation of said bimetal element in opposite directions into rotation of said dial in opposite directions on said shaft.

7. The invention of claim 6, wherein said converting means includes:

a torsion spring acting on said dial in a manner to continuously urge same in said one rotational direction; and a flexible line extending in a taut condition between said bimetal element and dial to oppose the force of said spring, said line becoming slack upon deformation of said bimetal element in a direction corresponding to increasing temperature, thereby permitting movement of said dial in said one rotational direction under the influence of said spring.

* * * * *